United States Patent [19]

Krause

[11] 4,278,854
[45] Jul. 14, 1981

[54] TILT INDICATING DEVICE

[76] Inventor: Hans H. Krause, 10212 N. Cedarburg Rd., Mequon, Wis. 53092

[21] Appl. No.: 31,755

[22] Filed: Apr. 20, 1979

[51] Int. Cl.³ .................................................. H01H 35/02
[52] U.S. Cl. ................................. 200/52 A; 200/61.52; 200/84 R; 340/689
[58] Field of Search ..... 200/52 R, 52 A, 61.45–61.53, 200/84 R; 340/689, 690; 73/505; 244/80

[56] References Cited

U.S. PATENT DOCUMENTS

| | | | |
|---|---|---|---|
| 2,094,767 | 10/1937 | Coburn | 33/353 |
| 2,820,116 | 1/1958 | Alberts | 200/61.52 |
| 3,161,739 | 12/1964 | Suozzo | 340/689 |
| 3,359,550 | 12/1967 | Christensen | 340/689 |

Primary Examiner—S. J. Witkowski
Assistant Examiner—Morris Ginsburg
Attorney, Agent, or Firm—James E. Nilles

[57] ABSTRACT

A tilt indicating device mountable on a tiltable vehicle or machine component and operable to close an electrical circuit to thereby give an audio/visual warning or initiate levelling action in case of tilt. The device comprises an insulated housing having a chamber therein filled with electrically non-conductive viscous damping fluid in which a float is submerged and upwardly bouyed. An electrically conductive ball and socket pivot assembly connects the float to the chamber floor and enables tilting of the housing relative to the float in any direction from vertical. An electrically conductive circular disc horizontally mounted on the float stem and electrically connected through the pivot means to a connector terminal on the exterior of the housing is spaced from but engageable during tilt with the upper edge of an annular collector ring mounted on the housing floor and surrounding the pivot means. The collector ring which may include either a continuous electrical conductor (for indicating a predetermined degree of tilt in any direction) or a plurality of conductive segments insulated from one another (for indicating the direction as well as degree of tilt) is electrically connected to a connector terminal or terminals on the exterior of the housing. An air-filled fluid expansion chamber in the housing connects to the fluid chamber. The pivot assembly is vertically adjustable from the exterior of the housing to change the spacing between the disc and collector ring and thereby determine the tilt angle necessary for contact closure. A spirit level, adjustable levelling screws and mounting means are provided on the housing.

23 Claims, 11 Drawing Figures

TILT INDICATING DEVICE

BACKGROUND OF THE INVENTION

1. Field of Use

This invention relates generally to tilt indicating devices for mounting on tiltable vehicles or tiltable machine components and to control systems employing such devices.

2. Description of the Prior Art

Tilt indicating devices are used on off-the-road or rough-terrain vehicles to sense when the vehicle, or some movable component thereon, has reached a potentially dangerous tilt angle. Some such devices provide a direct visual indication of tilt so that appropriate corrective action can be taken by the machine driver or operator, while others are connected in control systems which either provide an audio/visual indication of tilt or effect levelling of the tilted vehicles or component. For example, when operating agricultural or construction machinery on a hillside, it is important that the vehicle itself not exceed a cetain tilt angle so as to prevent roll-over. Similarly, when operating vehicles such as cranes or fork-lift trucks which have tiltable components, such as booms or masts, respectively, it is important that the component not exceed a certain tilt angle to prevent vehicle imbalance and possible tip-over.

The prior art discloses many examples of mechanical and electromechanical slope or tilt indicating devices which give a direct read-out or which are employed in control systems which provide a read-out or a control function. For example, U.S. Pat. No. 3,377,714 discloses a device wherein an inverted pendulum type upright float is mounted for pivotal movement about a single axis in a liquid medium and gives a mechanical visual readout. U.S. Pat. No. 3,559,294 discloses a device wherein a float on the surface of a liquid tilts about a single axis and operates a potentiometer to give an electrical readout. U.S. Pat. No. 3,660,840 discloses a device wherein a float on a liquid surface makes electrical contact with four electrical contacts carried at the four corners of a cross-shaped member fixed to the reservoir. Each contact actuates a particular light to thereby indicate one of four possible directions of inclination. U.S. Pat. No. 2,772,411 discloses a device wherein a pendulum in liquid pivots about a single axis and operates a variable resistor to serve as a boom angle indicator for cranes. U.S. Pat. No. 3,945,391 discloses a device wherein a float immersed in liquid rotates about a single axis to operate a valve serving as a boom leveler. U.S. Pat. No. 3,865,265 teaches a device for electrically determining the direction and degree of tilt of the mast of a forklift truck and employs a pendulum immersed in liquid and swingable about a single axis which operates a potentiometer. U.S. Pat. No. 3,846,781 teaches a device wherein there is a pendulum and pointer swingable about a single axis for slope measurement and makes provision for actuating electrical contacts in response to pendulum movement. U.S. Pat. No. 3,805,398 teaches a pivotally mounted freely rotatable magnet which serves as an angle sensor for a drilling tool for earth boring. The magnet position determines energization of sensing coils which effect a readout.

SUMMARY OF THE INVENTION

In accordance with the invention, there are provided several embodiments of a tilt or slope indicating device which are adapted for mounting on a tiltable vehicle or a tiltable machine component. Also provided are several control systems for employing such devices and whereby either electrical audio/visual warning devices or machine or component levelling devices are actuated.

A tilt indicating device in accordance with the invention generally comprises a housing connectable in level position on a tiltable vehicle or component and having a chamber therein; a float located in the chamber; pivot means for pivotally connecting the float to the housing to enable relative pivotal mount of the float when the housing is tilted in any direction; electrically non-conductive high-viscosity damping liquid in the chamber and in which the float is submerged at least to the extent that float buoyancy maintain a positive upward force at the pivot means; first and second spaced apart electrical contact members in the chamber connected to the float and to the housing, respectively, and electrically interengageable with each other when the housing is tilted a predetermined degree in any direction; and electrical terminals located externally of the chamber and electrically connected to the first and second electrical contact members, respectively.

The first electrical contact member preferably takes the form of a circular disc which extends transversely to and radially outwardly from the tilt axis of the float. The second electrical contact member takes the form of an annular collector ring surrounding the tilt axis of the float and, preferably, secured at or near the floor of the housing. In one embodiment, the annular ring comprises a substantially continuous electrically conductive member. In another embodiment, the annular collector ring comprises a plurality of electrically conductive segments which are electrically insulated or spaced apart from each other.

In a preferred embodiment of the invention, the pivot means for pivotally connecting the float to the housing comprises a ball and socket joint, including first and second electrically conductive pivot members mechanically connected to the float and to the housing, respectively, and pivotally interconnected with each other and the float buoyancy upward force maintains positive electrical contact between the ball and socket pivot members.

Furthermore, in a preferred embodiment, the first electrical contact member or disc is connected to the float for movement therewith by being electrically and mechanically connected to the first electrically conductive pivot member.

Adjustment means are provided for adjusting or changing the distance at which the first and second electrical contact members are spaced apart from each other to thereby adjust or change the predetermined angle to which the housing of the device must be tilted to ensure contact engagement. Preferably, such adjustment means comprise an adjustment screw accessible from the exterior of the housing for raising and lowering the pivot means to thereby effect corresponding movement of the disc relative to the collector ring.

Means are provided on the housing for initially adjusting or levelling the device relative to the tiltable vehicle or component and preferably take the form of a plurality of threaded legs movably attached to the housing and engageable with a surface on the vehicle or component on which the housing is mounted.

Means are also provided on the housing to initially ascertain or establish when the device is level and such means comprise an omni-direction bubble type or spirit level attached to or integral with the housing. The damping liquid is non-freezeable and one or more expansion chambers communicate with the chamber containing the liquid so as to provide a means to accommodate expansion and contraction of the liquid in response to ambient temperature changes.

The said one embodiment of the tilt device in which the collector ring comprises a substantially continuously electrically conductive member is connectable in series circuit with an electrical power source, such as a battery, and an electrically operable audio or visual warning device or alarm. The said other embodiment wherein the collector ring comprises electrically discrete segments is connectable in a control circuit of a type wherein each segment is in series circuit with an electrical power source and an electrically operable individual warning device. Or, the said other embodiment is connectable in a control circuit of a type wherein each segment operates a relay or solenoid valve, for example, which effects levelling of the vehicle or component.

In operation, when the vehicle or component on which the tilt indicating device is mounted is level or upright, the housing is also upright, and the tendency of the float to remain vertical maintains separation between the first and second contact means. However, when the housing tilts in any direction from vertical in response to corresponding tilting movement of the vehicle or component, the tendency of the stem attached to the float to remain vertical causes some portion or side of the upper edge of the collector ring to engage the underside of some portion of the disc thereby establishing electrical contact therebetween. In the said one embodiment, such contact, regardless of the direction of tilt, causes a single or common warning device, such as a light or buzzer, to be actuated, indicating that a tilt of some predetermined degree has been reached. In the said other embodiment, contact between the disc and one particular segment of the collector ring either causes a particular warning device to be actuated, indicating that a tilt of some predetermined degree and in a specific direction had been reached, or causes an appropriate levelling device, such as a hydraulic cylinder to be actuated to effect levelling of the tilted machine or component.

A tilt indicating device in accordance with the invention offers several advantages over the prior art. For example, the device is adapted for use with any type of tiltable vehicle, structure or component on which it can be physically mounted. The use of non-freezable damping liquid and provision of an air-filled expansion chamber therefor enables the device to be used and operate reliably in extremely hot or cold ambient temperatures. The device is responsive to tilting in any direction from the vertical and is not limited to tilting in a single plane or in only two transverse directions. The device can, furthermore, be adapted by use of the segmented collector ring to provide an indication of the direction of tilt, as well as the degree or extent of tilt or to provide appropriate corrective levelling. The sensitivity of the device, i.e., the degree or amount of tilt necessary to cause it to actuate its associated warning device or devices, can be changed or adjusted to suit particular operating circumstances and such change or adjustment can be accomplished from the exterior of the housing, without the need for disassembly of the device, by means of a simple tool such as a screw-driver. The use of a relatively high viscosity damping fluid and the use of upwardly acting positive floatation forces reduces the sensitivity of the device to transient tilting or bumps. The device is relatively simple in principle of operation and construction, economical to manufacture, reliable and versatile in use, and quickly and easily adjusted in the field. Other objects and advantages of the invention will hereinafter appear.

DESCRIPTION OF PREFERRED EMBODIMENTS

Figure 1:
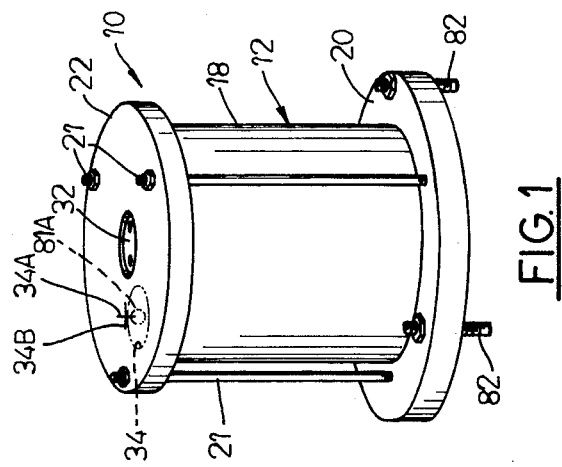
FIG. 1 is a perspective view of a first embodiment of a slope or tilt indicating device in accordance with the invention.
Figure 2:
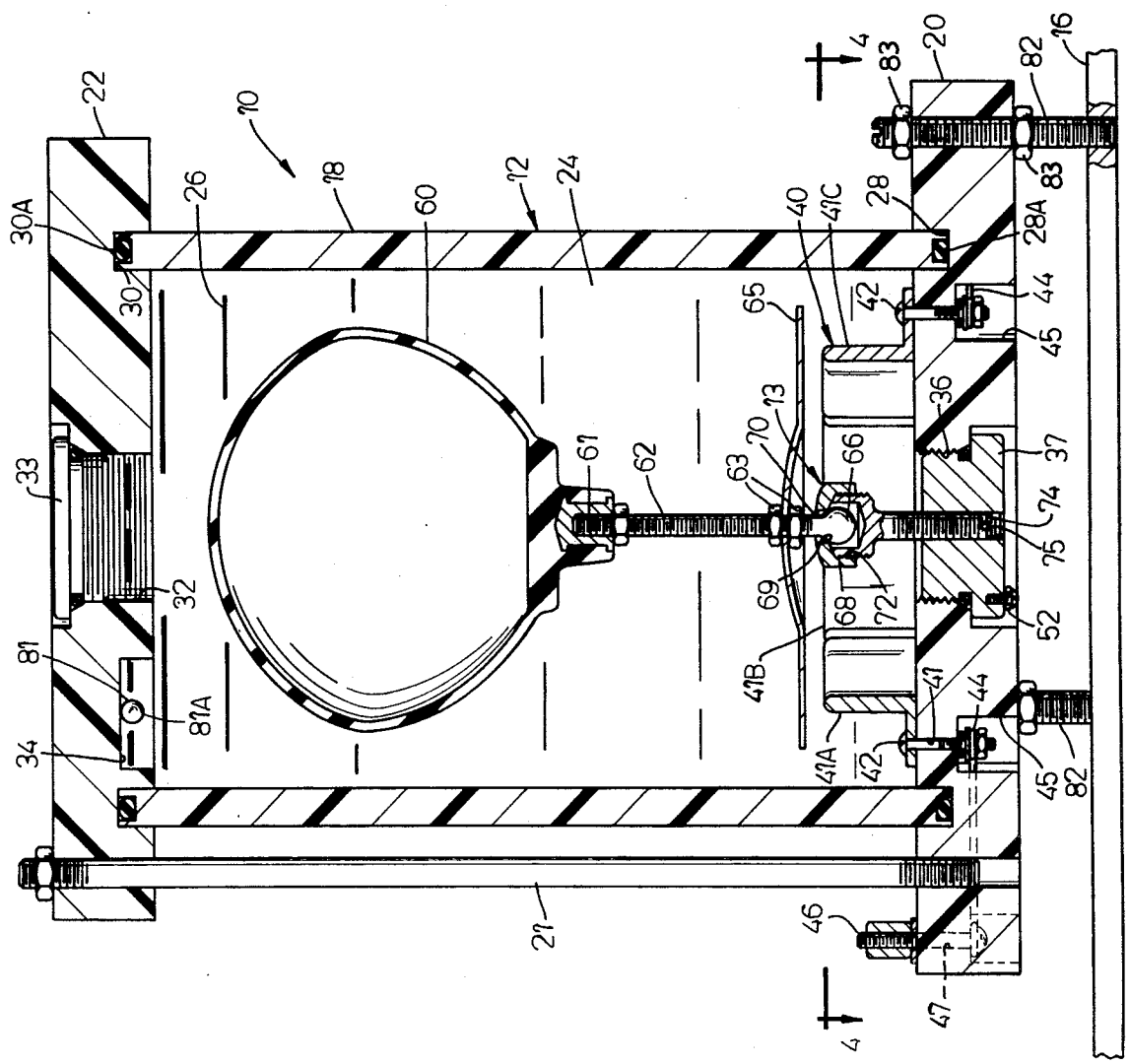
FIG. 2 is an enlarged, vertical cross-sectional view of the device shown in FIG. 1, and showing it in non-tilted position.
Figure 3:
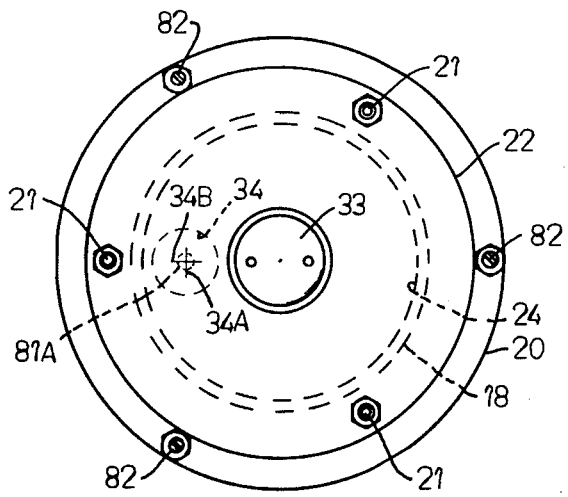
FIG. 3 is a top plan view of the device of FIGS. 1 and 2.
Figure 6:
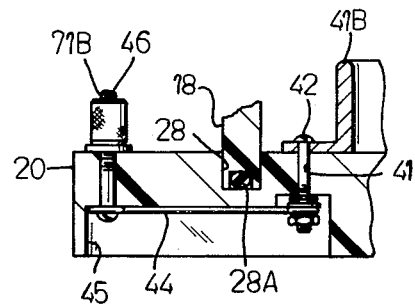
FIG. 6 is an enlarged, cross sectional view of a portion of the device taken on line 6—6 of FIG. 5.
Figure 7:
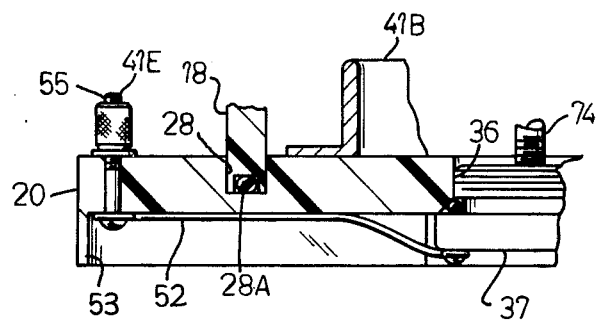
FIG. 7 is an enlarged, cross sectional view of a portion of the device taken on line 7—7 of FIG. 5.
Figure 4:
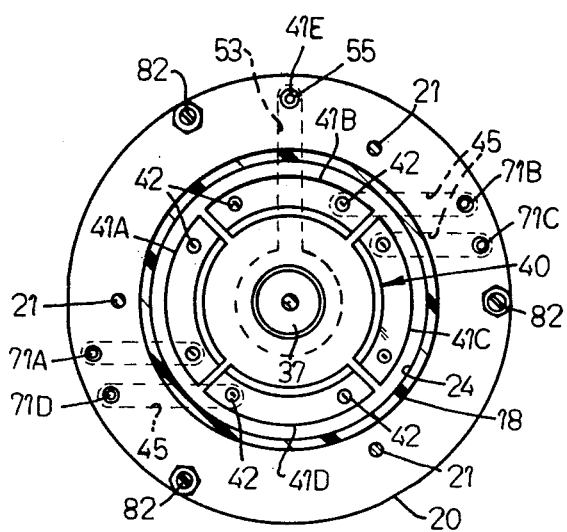
FIG. 4 is a cross sectional view of the device taken on line 4—4 of FIG. 2.
Figure 5:
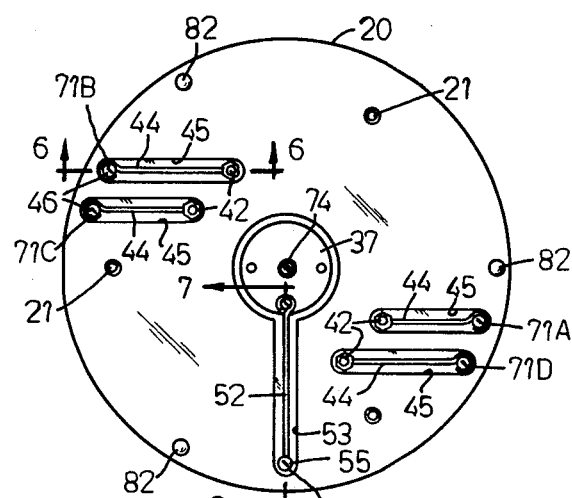
FIG. 5 is a bottom plan view of the device of FIGS. 1, 2 and 3.
Figure 10:
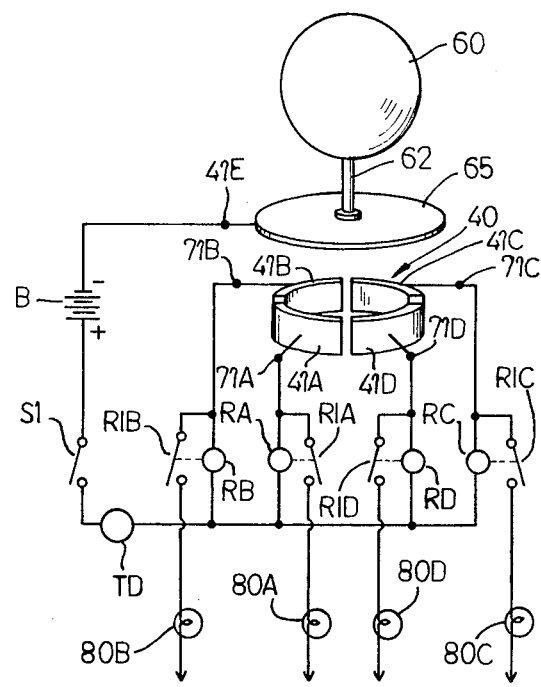
FIG. 10 is a schematic diagram of an electrical circuit for the device shown in FIGS. 1 through 9.
Figure 11:
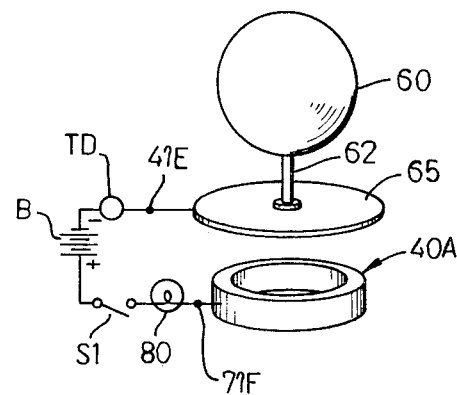
FIG. 11 is a schematic diagram of an electrical circuit for another embodiment of a device in accordance with the invention.

Referring to FIGS. 1, 2 and 3, numeral 10 designates a tilt indicating device which is mountable on structural member 16 of a tiltable vehicle or machine component (not shown) and which is operable to close an electrical circuit to thereby give an audio/visual warning or initiate levelling action in case of tilt. The device 10 comprises an insulated housing 12 having a liquid chamber 24 therein filled with electrically non-conductive, non-freezable viscous damping liquid 26 in which a float 60 is submerged and upwardly bouyed. An electrically conductive ball and socket pivot assembly 13, including a ball 66 and a socket 68, connects the float 60 to the chamber floor or base plate 20 and enables tilting of the housing 12 relative to the float in any direction from a vertical axis X (see FIG. 9). An electrically conductive circular disc 65 horizontally mounted on a float stem 62 and electrically connected through the pivot assembly 13 and pin 74 (FIG. 7) to a connector terminal 41E on the exterior of the housing 12 is spaced from but engageable during tilt with the upper edge of an annular connector ring 40 mounted on the housing floor 20 and surrounding the pivot assembly 13. As FIGS. 2, 4 and 10 show, the collector ring 40 includes a plurality of conductive segments 41A, 41B, 41C and 41D which are insulated from one another and provide for indicating the direction as well as the degree of tilt. These segments are electrically connected to a plurality of connector terminals 71A, 71B, 71C and 71D, respectively, on the exterior of the housing 12. As FIG. 11 shows, in an alternative embodiment, a collector ring 40A is provided and comprises a continuous electrical conductor for indicating a predetermined degree of tilt in any direction. An air-filled fluid expansion chamber 34 in the housing 12 connects to the liquid chamber 24. The pivot assembly 13 is vertically adjustable from the exterior of the housing by means of a screw 74 to change the spacing between the disc 65 and collector ring 40 and thereby determine the tilt angle necessary for contact closure. A spirit level 81, adjustable levelling screws 82 and a plurality of mounting nuts 83 are provided on the housing 12.

Figure 8:
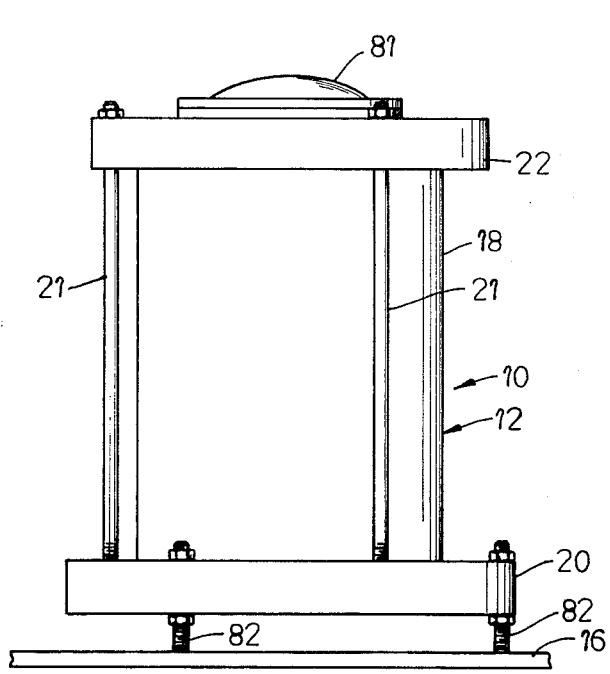
FIG. 8 is a side elevational view of the device of FIGS. 1 and 7 and showing a modification thereof.

As FIGS. 2 and 8 show, the device 10 is adapted for use with and for mounting in a fixed level position on structural member 16 of a tiltable vehicle (not shown) or on a tiltable machine component (not shown) by means of adjustable levelling and mounting bolts or screws 82. Chamber 24 of housing 12 is completely filled with an electrically non-conductive non-freezable highly viscous damping liquid 26, such as "200 Fluid," a dimethylpolysiloxane having a viscosity of 10,000 C.S., and available from the Accumetric Division of Detrex Chemical Industries, P. O. Box 843, Elizabethtown, N. J. Housing 12 comprises an electrically non-conductive generally flat circular base plate or member 20, an electrically non-conductive generally flat circular top cover plate or member 22, and a hollow cylindrical or tubular intermediate member 18. The members 18, 20 and 22 are preferably fabricated of plastic and are mechanically secured together in permanent leak-proof relationship by means of tie rods 21 and annular grooves 28 and 30 in the members 20 and 22, respectively, which receive the lower and upper ends, respectively, of tubular member 18. Preferably, the grooves 28 and 30 contain O-ring seals 28A and 30A, respectively. Cover plate 22 is provided with an internally threaded or tapped liquid fill port 32 extending therethrough, which port is sealable by means of a removable sealing screw 33. Cover plate 22 is also provided with the recess or expansion chamber 34 extending inwardly from the underside thereof, and preferably formed by drilling, in which air is entrapped when chamber 24 is filled with liquid 26. The trapped air in recess 34 is compressible and, therefore, recess 34 can accommodate some liquid 26 as the latter expands within sealed chamber 24 when device 10 is exposed to sufficiently high ambient temperatures, such as occur in direct sunlight on hot summer days.

Base plate 20 is provided with a centrally located internally threaded bore or hole 36 therethrough in which an electrically conductive hollow cylindrical externally and internally threaded sleeve 37 is secured, which sleeve supports the adjustable pivot assembly 13 hereafter described in detail. Base plate 20 supports the hollow cylindrical or annular metal collector ring 40 which is secured thereto by suitable electrically conductive bolts 42. Holes 41 extend through base plate 20 and accommodate the electrically conductive bolts 42 which also make electrical contact with the lower flanged edge of each segment 41A–41D of ring 40. As FIGS. 2, 4, 5, and 6 show, each bolt 42 is electrically and mechanically connected to an electrically conductive strap 44 which lies in a recess 45 formed in the underside of base plate 20. Each strap 44 is electrically and mechanically connected to a connector terminal 71A–71D in the form of a threaded bolt 46 which extends through a hole 47 in base plate 20. Base plate 20 is provided with an electrically conductive strap 52 which lies in a recess 53 formed in the underside of base plate 20. Strap 52 is electrically and mechanically connected between sleeve 37 and connector terminal 41E. Terminal 41E comprises an electrically conductive threaded member 55 which serves as another terminal connector.

As FIG. 2 shows, float 60 is immersed and buoyed up in the liquid 26, and takes the form of a hollow flexible sphere having a threaded sleeve 61 at its bottom. Float 60 is mechanically connected by sleeve 61 to the upper threaded end of elongated electrically conductive stem 62 which extends downwardly therefrom. The electrically conductive contact means in the form of circular metal disc 65 is electrically and mechanically connected to the lower externally threaded end of stem 62 by a pair of nuts 63 and is disposed above and spaced apart from ring 40 when device 10 is upright or untilted, as shown in FIG. 2.

The electrically conductive pivot means or assembly 13 are provided for pivotally connecting the lower end of stem 62 (and thus the float 60) to the base 20 of housing 12. The pivot assembly 13 comprises a ball-and-socket joint which includes an internally threaded ball member 66 which is an integral part of the externally threaded lower end of stem 62 and a socket member 68 is engageable with the ball. Socket member 68 comprises a socket or recess 69 for accommodating ball 66, an upper opening 70 for accommodating the portion of stem 62 connected to the ball, and internally threaded lower opening 72 for threadedly engaging the externally threaded upper end of a support and adjustment screw or pin 74. Pin 74 is screwed into the threaded sleeve 37 in base plate 20 of housing 12 and serves as a means by which the pivot assembly is physically supported on the housing 12 and by which the pivot assembly (and the spacing between the contacts 40 and 65) are vertically adjusted. Pin 74, has a slot 75 for receiving the tip of a screw-driver (not shown) at its lower end.

As hereinbefore mentioned, a spirit level 81 and adjustable levelling screws 82 are provided for initially establishing device 10 in a level (or other desired) position on framework 16. Spirit level 81 may take the form of a commercially available bubble type spirit level attached to the top of housing 12, as shown in FIG. 8, and, for example, a "Level All" device available from Reese, Elkhart, Ind., would be suitable. If preferred, the level 81 may be integrally formed in the housing 12 of the device 10, as shown in FIGS. 2 and 3. In the latter arrangement, cover 22 is transparent and an air bubble 81A trapped in the fluid 26 in expansion chamber 34 is alignable with cross-hairs 34A and 34B to provide a spirit level. When device 10 is level, the levelling screws 82 are adjusted to maintain the level condition and the mounting nuts 83 are securely fixed in place on the mounting screws 82.

Device 10, once installed in the desired position on framework 16, is electrically connected in circuit as follows. Referring to FIGS. 2 and 10 which show the embodiment of device 10 wherein a segmented collector ring 40 is employed, it is seen that connector terminal 41E (which is electrically connected to disc 65 through the electrically conductive pivot assembly 13), is connected to the negative terminal of a battery B. The positive terminal of battery B is connectable through a single pole, single throw on-off switch S1 to one side of each of a plurality of relay coils RA, RB, RC, RD. The other side of these relay coils are electrically connected to the connector terminals 71A, 71B, 71C, 71D, respectively on device 10. Energization of a relay coil is effected by tilting of device 10 and establishment of electrical control between disc 65 and an appropriate one of the segments 41A–41D. Energization of a relay coil effects closure of its corresponding relay contact R1A–R1D. Closure of a relay contact R1A–R1D effects either activation of an appropriate audio/visual electrical device (such as a horn or light) thereby indicating that tilt of a predetermined degree and in a certain direction has occurred. Or, if preferred, the relays could be connected to operate solenoid coils which direct hydraulic fluid to hydraulic levelling cylinders to effect levelling of the tilted machine or tilted component, as shown in FIG. 9.

In the embodiment of device 10 shown in FIG. 11, wherein collector ring 40A is employed, disc 65 is connected through contact 41E to the negative terminal of battery B and the positive battery terminal is connectable through switch S1 to one side of a warning device such as a lamp 80. The other side of lamp 80 is connected through a connector terminal 71F on device 10 to continuous collector ring 40A.

Figure 9:
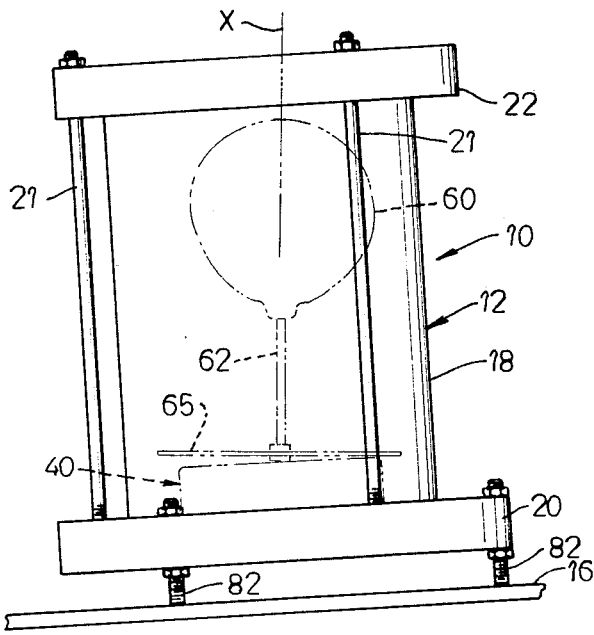
FIG. 9 is a view similar to FIG. 8, but showing the device in tilted position.

In operation of the embodiment shown in FIG. 11, when switch S1 is closed, tilting of device 10 from the position shown in FIG. 2 to the position shown in FIG. 9 causes a portion of the upper edge of ring 40A to make electrical contact with a portion of the underside of disc 65 near the outer edge of the latter, thereby completing an energizing circuit for lamp 80 which turns on to indicate to the vehicle operator that the vehicle or component (not shown) to which device 10 is attached has tilted from the vertical at least some predetermined angle in some direction, which angle is determined by the spacing between the contacts 65 and 40. With such an indication, the operator may then take such necessary action as may be required. As is apparent from FIG 2, if the distance between disc 65 and ring 40 is increased or decreased, by raising or lowering, respectively, the contact 65, a greater or lesser angle of tilt, respectively, will be required to actuate the warning light 80. Contact 65 is raised or lowered by using a screw-driver (or similar tool) to rotate pin 74 in sleeve 37 thereby causing socket 68, ball 66 therein, stem 62, disc 65 and float 60 to be correspondingly raised or lowered. Since chamber 24 is completely filled and float 60 is completely immersed therein, raising of the float out of the liquid 26 is not possible and, therefore, changes in float behavior do not occur.

In FIG. 10, when ring 40 tilts relative to disc 65, the latter engages that one segment 41A–41D which relates to the direction of tilt and causes actuating of that corresponding relay contact, indicating to the operator the direction of tilt or to effect operation of an appropriate levelling device. As will be understood, in practice, the lamps 80A–80D are so arranged or marked as to provide information regarding direction of tilt to the operator. If preferred, solenoid coils (not shown) could be used in place of lamps 80A–80D.

In the embodiments shown, the warning device or devices take the form of lamps but it is apparent that audible warning devices, such as buzzers or horns, could be used in place of or in conjunction with the lamp 80 or the lamps 80A–80D. Furthermore, a greater or lesser number of segments could be provided in ring 40 as well as a corresponding number of suitable warning or levelling devices therefor.

In the embodiments of the invention disclosed herein, the use of a viscous electrically non-conductive damping fluid affords several advantages. First of all, the liquid serves as an electrical insulator between the tiltably engageable contact members when they are in the open position. Second, the liquid slows the relative movement between the float and the housing as the device is tilted and thereby ensures that the device is not immediately responsive to transient conditions caused by bumps and potholes which would otherwise effect contact closure thereby causing false warnings or undesirable corrective action of the levelling device. The relatively large size of the float and the relatively large surface area of the disc exposed to the viscous liquid enhances the damping effect. It should also be noted that submersion of the float completely within the damping liquid causes a positive upwardly acting floatation force to be exerted and this has two benefits. First, it ensures that there is sound electrical contact between the relatively movable members in the pivot assembly at all times, without inhibiting the possiblity of relative pivotal motion in any direction from vertical. Second, the upward bouyancy force inhibits or prevents inadvertent breaking of contact within the pivot assembly or between the disc and collector ring which might otherwise result from hitting bumps or holes in rough terrain.

As FIGS. 10 and 11 show, it is possible to include an adjustable time delay relay TD in the circuits controlled by the disc and collector ring. The advantage of such time delay is that actuation of the warning device or a corrective levelling device can be prevented unless the tilt condition exists for a predetermined length of time. In an actual embodiment of the invention, an adjustable time delay relay having a delay range of zero to ten seconds was employed and time intervals within that range were tested.

What is claimed is:

1. A tilt indicating device for a tiltable machine or component, comprising:
    a housing subject to a tilting motion to be detected and having therein a chamber containing liquid;
    a float in said chamber buoyantly supported by said liquid therein;
    a support member having a pivotal connection with said housing at the lower end of said member and also having a fixed connection to said float at the upper end of said member, said connections defining an axis tending to remain substantially vertical and extending through said pivotal connection and the center of buoyancy of said float;
    first and second electrical contact members in said chamber and axially spaced apart, said first contact member attached to said support member and said second contact member attached to said housing, said contact members being electrically engageable in any direction from vertical, and said first and second contact members having electrically conducting portions laterally spaced from said axis.

2. A device according to claim 1 including adjustment means accessible from the exterior of said housing for adjusting said axial spacing between said first and second electrical contact members.

3. A device according to claim 2 wherein said adjustment means comprises a rotatable threaded member for raising and lowering said pivotal connection relative to said housing.

4. A device according to claim 1 including levelling means on said housing for ascertaining when said device is mounted in level position relative to said tiltable machine or component.

5. A device according to claim 1 including an air-filled fluid expansion chamber in said housing and communicating with said chamber.

6. A device according to claim 1 wherein said first and second contact members comprise a disc and an annular collector ring, respectively.

7. A device according to claim 6 wherein said collector ring comprises a continuous electrically conductive member engageable with said disc when the latter tilts in any direction.

8. A device according to claim 6 wherein said collector ring comprises a plurality of electrically conductive segments electrically insulated from each other and each engageable with said disc when the latter tilts in the direction of each of said segments.

9. A tilt indicating device comprising:
a housing subject to a tilting motion to be detected having therein a chamber containing liquid;
a float in said chamber buoyantly supported by said liquid therein;
pivot means including first and second electrically conductive pivot memebers mechanically connected to said float and to said housing, respectively, and pivotally interconnected to enable relative pivotal movement of said float when said housing is tilted in any direction from vertical;
a support member having said first pivot member comprising a mechanically pivoting and electrically conducting member at the bottom thereof and also having a connection at its upper end to said float, said pivot member and the center of buoyancy of said float defining an axis tending to remain substantially vertical;
first and second electrical contact members in said chamber and axially spaced-apart, said first contact member attached to said support member and said second contact member attached to said housing, said contact members being electrically engageable with each other when said housing is tilted a predetermined degree in any direction, said first and second contact members having electrically conducting portions laterally spaced from said axis;
first and second electric terminals located externally of said chamber and electrically connected to said first and second contact members, respectively; and
means on said housing for attaching said device to a tiltable machine or component in a predetermined position.

10. A device according to claim 9 including adjustment means accessible from the exterior of said housing for moving said pivot means to adjust the axial spacing between said first and second electrical contact members.

11. A device according to claim 9 including levelling means on said housing for ascertaining when said device is mounted in level position relative to said tiltable machine or component.

12. A device according to claim 9 including an air-filled fluid expansion chamber in said housing and communicating with said chamber.

13. A device according to claim 9 wherein said first and second contact members comprise a disc and an annular collector ring, respectively.

14. A device according to claim 13 wherein said collector ring comprises a continuous electrically conductive member engageable with said disc when the latter tilts in any direction.

15. A device according to claim 13 wherein said collector ring comprises a plurality of electrically conductive segments electrically insulated from each other and each engageable with said disc when the latter tilts in the direction of each of said segments.

16. A tilt indicating device comprising:
a housing subject to a tilting motion to be detected and having therein a chamber containing liquid;
a float in said chamber buoyantly supported by said liquid therein;
a rigid stem extending downwardly from said float and being electrically conductive and defining an axis;
pivot means including first and second electrically conductive pivot members connected to said stem and to said housing, respectively, and pivotally interconnected to enable pivotal movement of said float when said housing is tilted in any direction from vertical, one of said pivot members being a ball and the other a socket, with one of said ball or socket being electrically and mechanically connected to said stem and with the other of said ball or socket being connected to said housing;
an electrically conductive first contact member in said liquid and connected to said stem and movable with said float and electrically connected to said first pivot member, said fist contact member extending transversely relative to an axis extending between said float and said pivot means and also having an electrically conductive portion laterally spaced from said axis;
an electrically conductive second contact member supported on said housing in said liquid and spaced apart from said first contact member but engageable therewith when said housing is tiltable relative to said axis, said first contact member being mounted to said stem and being located axially between said float and said second contact member and being axially nearer the latter and also having an electrically conductive portion laterally spaced from said axis;
first and second electric terminal means on said housing exteriorly of said chamber and electrically connected to said second pivot member and to said second contact member, respectively; and
means on said housing for attaching said device to a tiltable machine or component in a predetermined position.

17. A device according to claim 16 including adjustment means accessible from the exterior of said housing for moving said pivot means relative to said housing to adjust the spacing between said first contact member and said second contact member.

18. A device according to claim 17 wherein said adjustment means comprises a threaded rotatable member mechanically connected to said pivot means and rotatably connected to said housing.

19. A tilt indicating device according to claim 16 wherein said housing includes an air-filled expansion chamber communicating with said chamber.

20. A device according to claim 16 wherein said first contact member comprises a disc and wherein said second contact member comprises an annular collector ring.

21. A tilt indicating device according to claim 20, wherein said annular collector ring comprises a continuous electrically conductive member.

22. A tilt indicating device according to claim 20 wherein said annular collector ring comprises discrete elecrically conductive members which are electrically insulated from each other.

23. A tilt indicating device according to claim 16 including levelling means on said housing for ascertaining when said device is mounted in level position relative to said tiltable machine or component.

* * * * *